Aug. 22, 1933.　　　　G. W. VEALE　　　　1,923,765
AUTOMOBILE HEATER
Filed May 31, 1930
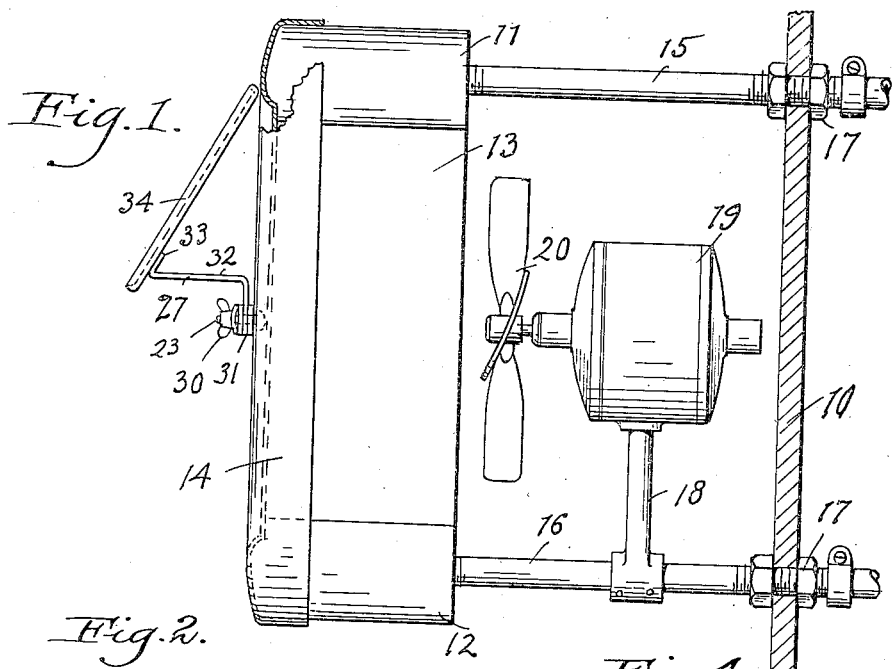
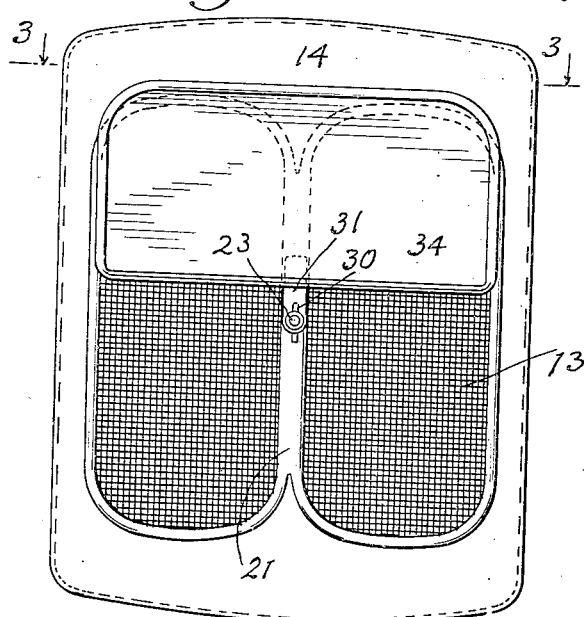
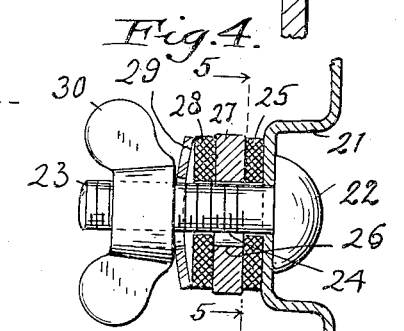
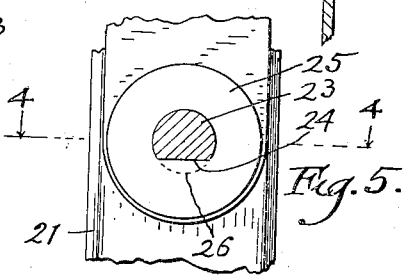
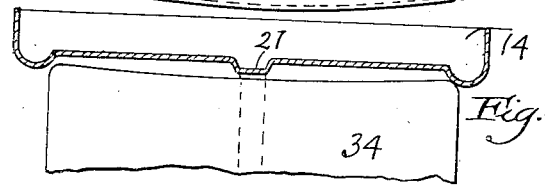
Inventor
George W. Veale
Kwis Hudson & Kent
attys.

Patented Aug. 22, 1933

1,923,765

UNITED STATES PATENT OFFICE 1,923,765

AUTOMOBILE HEATER

George W. Veale, Cleveland Heights, Ohio, assignor to Eaton Manufacturing Company, Cleveland, Ohio, a Corporation of Ohio Application May 31, 1930. Serial No. 457,718

3 Claims. (Cl. 257—137)

This invention relates to automobile heaters and more particularly to a deflector for directing the flow of heated air from the heater, and means for mounting the same on the heater.

It is an object of the present invention to provide an improved mounting for the deflector.

Another object of the invention is to simplify and improve the construction and operation of devices of this character, and to render the same inexpensive to manufacture, substantially fool proof, and not likely to get out of order.

Other objects and features of novelty will be apparent as the following description proceeds, reference being had to the accompanying drawing, in which Figure 1 is an elevation, partly in section of an automobile heater, showing one embodiment of the present invention as applied thereto.

Fig. 2 is a front elevation of the structure shown in Fig. 1.

Fig. 3 is a section taken along the line 3—3 of Fig. 2.

Fig. 4 is an enlarged section through the means for mounting the deflector on the heater taken on line 4—4 of Fig. 5, and Fig. 5 is a section taken along the line 5—5 of Fig. 4.

Referring more particularly to the drawing, the heater is illustrated as being mounted upon an automobile dash 10. The heater is provided with a heat exchanger comprising an upper tank 11 and a lower tank 12, which tanks are connected by a radiator core 13, of cellular or other preferred construction.

The front of the tanks 11 and 12 and the sides of the core 13 are preferably covered by a radiator shell 14. An inlet pipe 15 is connected to the tank 11, passes through the dash 10 and extends therebeyond for connection to a hotter portion of the automobile engine cooling system. The tank 12 is connected to an outlet pipe 16 which also passes through the dash 10, but is for connection to a cooler portion of the cooling system. The pipes 15 and 16 are rigidly secured to the dash as by nuts 17, and may form the sole support for the heater.

The pipe 16 carries a bracket 18 which serves as a support for a motor 19, the shaft of which carries a fan 20 located close to the core 13 for circulating air therethrough. The structure described above is known in the art and forms no part of the present invention, other than in combination with the structure now to be described.

As shown in Fig. 2, the shell 14 is open for the greater part of the area of the core 13, except for a central parting strip or bridge member 21, preferably integral with the radiator shell. As shown in Fig. 4 the part 21 is raised at its central portion to provide a recess for receiving the head 22 of an anchor or pivot in the form of a bolt 23, which projects outwardly through a central aperture in the part 21. The bolt 23 has a flat portion 24, which prevents the bolt from turning in said aperture, and a washer 25 is fitted over the bolt 23 and is provided with a flat portion 26 adapted to engage the flat portion 24 so as to prevent rotation of the washer.

A resilient arm 27, which supports the deflector according to the present invention, is provided with a central aperture larger than the bolt 23, which is fitted thereover, with the arm 27 in contact with the washer 25. A second washer 28 similar to the washer 25 is next fitted over the bolt 23, followed by a spring washer 29. A wing nut 30 is threaded on the outer end of the bolt 23 and engaging the spring washer 29 serves to clamp all of the elements on the bolt 23. The washers 25 and 28 are preferably of fiber, but this material is not essential.

In the position shown in Fig. 1 the arm 27 comprises a vertical portion 31 mounted on the stud 23, a horizontal portion 32, and an upwardly inclined portion 33. The portion 33 is rigidly secured to the central portion of a deflector plate 34, which extends upwardly and inwardly therefrom into contact with the shell 14. The parts are so arranged that when the wing nut 30 is tightened the plate 34 bears against the shell 14 with a spring action, thus clamping the same and preventing rattling thereof.

From the foregoing description it will be readily apparent that the deflector 34 is mounted and supported entirely independently of the core 13. Furthermore, by adjustment of the wing nut 30 the arm 27 may be loosened, so that the same may be rotated about the bolt 23, which acts as a pivot, thus bringing the deflector 34 into any desired position of adjustment for directing the blast of heated air in any desired direction from the core 13. The flat portion 24 of the bolt 23 and the cooperating flat portions of the washers 25 and 28 will prevent any loosening of the wing nut 30.

While one embodiment of the invention has been illustrated and described in such detail as to enable anyone skilled in the art to practice the invention, nevertheless the same is not to be limited to any of the details disclosed, other than as necessitated by the development of the prior art, but instead the invention embraces such embodiments of the broad idea as fall within the scope of the subjoined claims.

Having thus described my invention what I claim is:

1. In an automobile heater, a radiator comprising a core, a shell associated with said core and having an integral bridge member extending across the face of said core, a pivot member carried by said bridge member, an arm pivoted on said pivot member, a deflector plate rigidly secured on said arm, and means for adjustably clamping said arm on said pivot member and thereby clamping said plate against said shell.

2. In an automobile heater, a radiator including a core having an exposed face, a shell associated with said core, a pivot member positioned centrally of the exposed face of the core, a resilient arm carried by said pivot member, and a deflector plate carried by said arm, said plate being disposed at an angle to the face of the core, one edge of said plate engaging said shell, said plate being adjustable about said pivot member.

3. In an automobile heater, a radiator including a core having an exposed face, a shell associated with said core, said shell including a bridge member extending across the exposed face of said core, a pivot member secured to said bridge member, said pivot member being positioned centrally of the exposed face of the core, and a deflector plate adjustable about said pivot member, said deflector plate being angularly disposed, the portion of the plate adjacent the center of the face of the core being farther from the face of the core than the portion of the plate remote from the pivot member.

GEORGE W. VEALE.